US012312770B2

(12) United States Patent
Hijikata et al.

(10) Patent No.: US 12,312,770 B2
(45) Date of Patent: May 27, 2025

(54) CONSTRUCTION MACHINE

(71) Applicant: Hitachi Construction Machinery Co., Ltd., Tokyo (JP)

(72) Inventors: Seiji Hijikata, Tsukuba (JP); Yasutaka Tsuruga, Ryugasaki (JP); Masatoshi Hoshino, Tsuchiura (JP); Ryou Yagisawa, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 16 days.

(21) Appl. No.: 17/908,084

(22) PCT Filed: Apr. 7, 2021

(86) PCT No.: PCT/JP2021/014785

§ 371 (c)(1),
(2) Date: Aug. 30, 2022

(87) PCT Pub. No.: WO2021/261051

PCT Pub. Date: Dec. 30, 2021

(65) Prior Publication Data

US 2023/0099135 A1 Mar. 30, 2023

(30) Foreign Application Priority Data

Jun. 22, 2020 (JP) ................................. 2020-107172

(51) Int. Cl.
*E02F 9/22* (2006.01)
*F15B 1/02* (2006.01)

(52) U.S. Cl.
CPC ............ *E02F 9/2203* (2013.01); *F15B 1/024* (2013.01); *F15B 2211/2658* (2013.01)

(58) Field of Classification Search
CPC ... E02F 9/2203; F15B 1/024; F15B 2211/212; F15B 2211/2658
See application file for complete search history.

(56) References Cited

U.S. PATENT DOCUMENTS 5,355,773 A * 10/1994 Winkels .................. F15B 11/02 91/452
5,571,226 A 11/1996 Kobayashi
(Continued)

FOREIGN PATENT DOCUMENTS

CN 1109950 A 10/1995
FR 2880143 A1 * 6/2006 .......... F15B 11/0426
(Continued)

OTHER PUBLICATIONS

JP59006403A_t machine translation thereof (Year: 1984).*
FR2880143A1_t machine translation thereof (Year: 2006).*
International Search Report (PCT/ISA/210) issued in PCT Application No. PCT/JP2021/014785 dated Jun. 29, 2021 with English translation (five (5) pages).
(Continued)

*Primary Examiner* — Matthew Wiblin
(74) *Attorney, Agent, or Firm* — Crowell & Moring LLP

(57) ABSTRACT

An object of the present invention is to provide a construction machine that is equipped with a pressure accumulating device, which accumulates the return oil of an actuator, and that is capable of adjusting the operation speed of the actuator according to the revolution speed of a prime mover. For this purpose, in a construction machine including a prime mover, a revolution speed setting device that sets a revolution speed of the prime mover, an actuator, a pressure accumulating device that can supply and discharge a hydraulic fluid to and from the actuator, a first control valve disposed on a hydraulic fluid line that connects the pressure accumulating device and the actuator to each other, an operation device that gives an instruction for operation of the actuator, and a controller that is inputted with an operation signal of the operation device and outputs a control signal to the first control valve, the controller controls the first control valve according to an operation amount of the
(Continued)

operation device and the revolution speed set by the revolution speed setting device.

4 Claims, 4 Drawing Sheets

(56) References Cited

U.S. PATENT DOCUMENTS

| | | | |
|---|---|---|---|
| 10,633,828 B2 | 4/2020 | Joo | |
| 2015/0218780 A1 | 8/2015 | Hijikata et al. | |
| 2020/0115886 A1* | 4/2020 | Horii | E02F 9/2282 |
| 2021/0071391 A1* | 3/2021 | Takahashi | F15B 11/163 |

FOREIGN PATENT DOCUMENTS

| | | | | | |
|---|---|---|---|---|---|
| JP | 59006403 | A | * | 1/1984 | F15B 11/16 |
| JP | 5-287774 | A | | 11/1993 | |
| JP | 9-158255 | A | | 6/1997 | |
| JP | 2009-275771 | A | | 11/2009 | |
| JP | 2013-2122 | A | | 1/2013 | |
| JP | 2015-148237 | A | | 8/2015 | |
| JP | 2015-222099 | A | | 12/2015 | |

OTHER PUBLICATIONS

Japanese-language Written Opinion (PCT/ISA/237) issued in PCT Application No. PCT/JP2021/014785 dated Jun. 29, 2021 (three (3) pages).

International Preliminary Report on Patentability (PCT/IB/338 & PCT/IB/373) issued in PCT Application No. PCT/JP2021/014785 dated Jan. 5, 2023, including English translation of document C2 (Japanese-language Written Opinion (PCT/ISA/237) filed on Aug. 30, 2022) (five (5) pages).

Chinese-language Office Action issued in Chinese Application No. 202180019718.3 dated Jul. 31, 2023 with English translation (16 pages).

Korean-language Office Action issued in Korean Application No. 10-2022-7031121 dated Jan. 31, 2024 with English translation (12 pages).

Extended European Search Report issued in European Application No. 21828011.3 dated Feb. 7, 2024 (7 pages).

* cited by examiner

CONSTRUCTION MACHINE

TECHNICAL FIELD

The present invention relates to a construction machine such as a hydraulic excavator.

BACKGROUND ART

Patent Document 1 describes a fluid pressure actuator control circuit that can reduce fuel consumption by supplying a hydraulic fluid accumulated in an accumulator (pressure accumulating device) to a boom cylinder and correspondingly reducing a flow rate to be fed from a pump to the boom cylinder.

PRIOR ART DOCUMENT

Patent Document

Patent Document 1: JP-2009-275771-A

SUMMARY OF THE INVENTION

Problems to be Solved by the Invention

With a hydraulic excavator in the related art, work may be performed with an engine speed decreased, when an operator performs fine work or when the noise of a machine body is desired to be reduced. Decreasing the engine speed can decrease a supply amount of hydraulic fluid from a hydraulic pump to an actuator, and thus slow the operation of the hydraulic excavator as a whole. However, the fluid pressure actuator control circuit described in Patent Document 1 supplies hydraulic fluid from the accumulator to the actuator when the pressure of the hydraulic fluid is sufficiently accumulated in the accumulator. Hence, even when the engine speed is decreased, the supply amount of hydraulic fluid from the accumulator to the actuator is not changed, and thus the speed of the actuator cannot be decreased.

The present invention has been made in view of the above-described problems. It is an object of the present invention to provide a construction machine that is equipped with a pressure accumulating device, which accumulates the return oil of an actuator, and that is capable of adjusting the operation speed of the actuator according to the revolution speed of a prime mover.

Means for Solving the Problem

In order to achieve the above object, according to the present invention, there is provided a construction machine including a prime mover, a hydraulic pump driven by the prime mover, a revolution speed setting device that sets a revolution speed of the prime mover, an actuator, a pressure accumulating device that accumulates a return oil of the actuator, a first control valve disposed on a hydraulic fluid line that connects the pressure accumulating device and the actuator to each other, an operation device that gives an instruction for operation of the actuator, and a controller that is inputted with an operation signal of the operation device and outputs a control signal to the first control valve, the controller being configured to control the first control valve according to an operation amount of the operation device and the revolution speed set by the revolution speed setting device.

According to the present invention configured as described above, in the construction machine equipped with the pressure accumulating device that accumulates the return oil of the actuator, the flow rate of hydraulic fluid supplied and discharged to and from the actuator by the pressure accumulating device changes according to the revolution speed of the prime mover. It is thus possible to adjust the operation speed of the actuator according to the revolution speed of the prime mover.

Advantages of the Invention

According to the present invention, in the construction machine equipped with the pressure accumulating device that accumulates the return oil of the actuator, the operation speed of the actuator can be adjusted according to the revolution speed of the prime mover.

MODE FOR CARRYING OUT THE INVENTION

Figure 1:
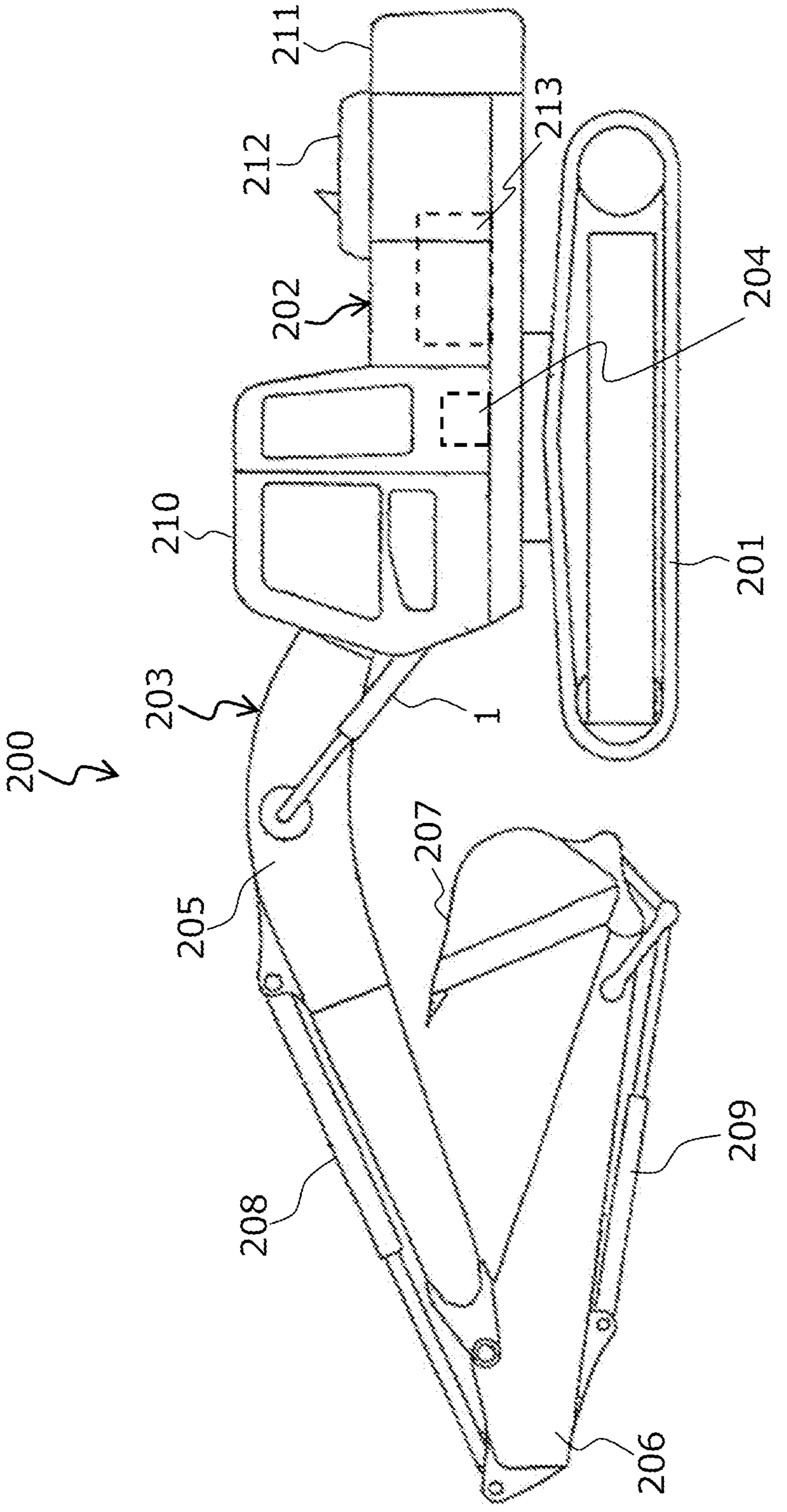
FIG. 1 is a side view of a hydraulic excavator according to an embodiment of the present invention.

With reference to the drawings, description will hereinafter be made by taking a hydraulic excavator as an example of a construction machine according to an embodiment of the present invention. Incidentally, in each figure, similar members are identified by the same reference numerals, and repeated description thereof will be omitted as appropriate.

FIG. 1 is a side view of a hydraulic excavator according to the present embodiment.

As illustrated in FIG. 1, a hydraulic excavator 200 includes a track structure 201, a swing structure 202 that is swingably disposed on the track structure 201 and constitutes a machine body, and a work device 203 that is vertically rotatably attached to the swing structure 202 and performs soil excavation work and the like. The swing structure 202 is driven by a swing motor 204.

The work device 203 includes a boom 205 vertically rotatably attached to the swing structure 202, an arm 206 vertically rotatably attached to a distal end of the boom 205, and a bucket 207 vertically rotatably attached to a distal end of the arm 206. The boom 205 is driven by a boom cylinder 1. The arm 206 is driven by an arm cylinder 208. The bucket 207 is driven by a bucket cylinder 209.

A cab 210 is provided in a front side position on the swing structure 202. A counterweight 211 that ensures a weight balance is provided in a rear side position on the swing structure 202. A machine room 212 is provided between the cab 210 and the counterweight 211. The machine room 212 houses an engine as a prime mover, a hydraulic pump, a control valve 213, and the like. The control valve 213 controls a flow of hydraulic fluid supplied to each actuator from the hydraulic pump. Incidentally, the prime mover in the present invention is not limited to an engine, and may be a motor whose revolution speed can be adjusted via an inverter.

Figure 2:
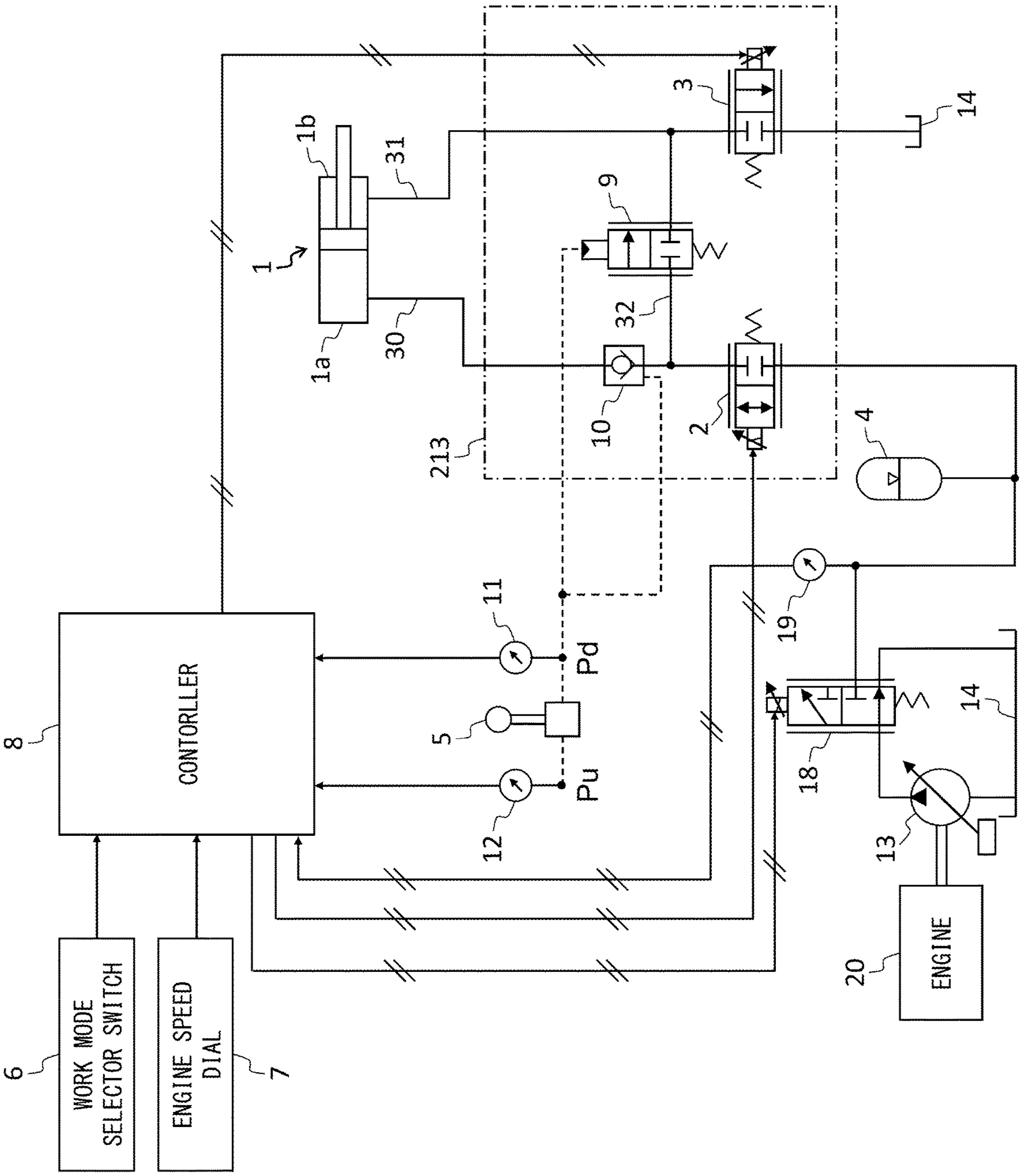
FIG. 2 is a circuit diagram of a hydraulic drive system included in the hydraulic excavator illustrated in FIG. 1.

FIG. 2 is a circuit diagram of a hydraulic drive system included in the hydraulic excavator 200.

A boom control lever 5 is an operation device for an operator to give an instruction for operation of the boom 205. When the boom control lever 5 is operated in a boom raising direction, the boom control lever 5 outputs a boom raising pilot pressure Pu. When the boom control lever 5 is operated in a boom lowering direction, the boom control lever 5 outputs a boom lowering pilot pressure Pd. The boom lowering pilot pressure Pd acts on a pilot check valve 10 and a pressure increasing control valve 9 to be described later. The boom lowering pilot pressure Pd is detected by a pressure sensor 11. The boom raising pilot pressure Pu is detected by a pressure sensor 12. Signals of the pressure sensors 11 and 12 are inputted to a controller 8.

A work mode selector switch 6 is an operation device for the operator to select a work mode. A signal of the work mode selector switch 6 is inputted to the controller 8. An engine speed dial 7 is an operation device for the operator to set the revolution speed of an engine 20. A signal of the engine speed dial 7 is inputted to the controller 8. The operator can adjust the operation speed of the hydraulic excavator 200 by changing the engine speed via the engine speed dial 7.

An accumulator 4 is a hydraulic apparatus that accumulates a return oil from a bottom side at a time of contraction of the boom cylinder 1, and supplies a hydraulic fluid to the bottom side at a time of extension of the boom cylinder 1. The accumulator 4 and a bottom side oil chamber 1*a* are connected to each other via a bottom side hydraulic fluid line 30. A control valve 2 (hereinafter a bottom side control valve) is disposed on the bottom side hydraulic fluid line 30. The bottom side control valve 2 changes an opening amount thereof according to a control signal from the controller 8, and thereby controls a flow rate to be supplied from the accumulator 4 to the bottom side oil chamber 1*a* of the boom cylinder 1 or a flow rate to be regenerated from the bottom side oil chamber 1*a* to the accumulator 4 (regeneration flow rate).

The pilot check valve 10 is disposed on a hydraulic fluid line section of the bottom side hydraulic fluid line 30, the hydraulic fluid line section connecting the bottom side control valve 2 and the bottom side oil chamber 1*a* to each other. The pilot check valve 10 inhibits the hydraulic fluid from flowing out of the bottom side oil chamber 1*a* when the boom lowering pilot pressure Pd does not act on the pilot check valve 10. The pilot check valve 10 allows the hydraulic fluid to flow out of the bottom side oil chamber 1*a* when the boom lowering pilot pressure Pd acts on the pilot check valve 10. Thus, a bottom pressure is maintained unless the boom control lever 5 is operated in the boom lowering direction. It is thus possible to prevent the boom 205 from falling against an intention of the operator.

A rod side oil chamber 1*b* of the boom cylinder 1 is connected to a hydraulic operating fluid tank 14 via a rod side hydraulic fluid line 31. A control valve 3 (hereinafter a rod side control valve) is disposed on the rod side hydraulic fluid line 31. The rod side control valve 3 adjusts an opening amount thereof according to a control signal from the controller 8, and thereby controls a flow rate to be discharged from the rod side oil chamber 1*b* of the boom cylinder 1 to the hydraulic operating fluid tank 14.

A hydraulic fluid line section of the bottom side hydraulic fluid line 30, the hydraulic fluid line section connecting the pilot check valve 10 and the bottom side control valve 2 to each other, is connected to a hydraulic fluid line section of the rod side hydraulic fluid line 31, the hydraulic fluid line section connecting the rod side oil chamber 1*b* and the rod side control valve 3 to each other, via a communication hydraulic fluid line 32. The pressure increasing control valve 9 is disposed on the communication hydraulic fluid line 32. The pressure increasing control valve 9 is closed when the boom lowering pilot pressure Pd does not act on the pressure increasing control valve 9. The pressure increasing control valve 9 is opened when the boom lowering pilot pressure Pd acts on the pressure increasing control valve 9. The bottom pressure can be increased by the bottom side hydraulic fluid line 30 being made to communicate with the rod side hydraulic fluid line 31 via the pressure increasing control valve 9 at a time of a boom lowering operation.

When the boom control lever 5 is operated in the boom lowering direction and the boom lowering pilot pressure Pd is outputted from the boom control lever 5, the controller 8 opens the bottom side control valve 2. At this time, the pressure maintaining function of the pilot check valve 10 is cancelled by the boom lowering pilot pressure Pd, and the pressure increasing control valve 9 is opened to increase the pressure on the bottom side of the boom cylinder 1. Consequently, the hydraulic fluid of the bottom side oil chamber 1*a* of the boom cylinder 1 is supplied to the accumulator 4 and the rod side oil chamber 1*b*, and the boom cylinder 1 performs a contracting operation.

When the boom control lever 5 is operated in the boom raising direction, and the boom raising pilot pressure Pu is outputted from the boom control lever 5, the controller 8 opens the bottom side control valve 2 and the rod side control valve 3. At this time, the pressure increasing control valve 9 is closed, and hence, the bottom side of the boom cylinder 1 is not increased in pressure. Consequently, the hydraulic fluid of the accumulator 4 is supplied to the bottom side oil chamber 1*a* of the boom cylinder 1, the hydraulic operating fluid of the rod side oil chamber 1*b* is discharged into the hydraulic operating fluid tank 14 via the rod side control valve 3, and the boom cylinder 1 performs an extending operation.

A hydraulic pump 13 is a hydraulic apparatus for supplying the hydraulic fluid to the accumulator 4 and other unillustrated actuators. The hydraulic pump 13 is driven by the engine 20. A delivery port of the hydraulic pump 13 is connected to either the hydraulic operating fluid tank 14 or the accumulator 4 via a charge control valve 18. The charge control valve 18 is switched according to a control signal from the controller 8. The pressure of the accumulator 4 is detected by a pressure sensor 19. A signal of the pressure sensor 19 is inputted to the controller 8. The controller 8 can maintain the pressure of the accumulator 4 by switching the charge control valve 18 according to the pressure of the accumulator 4.

Figure 3:
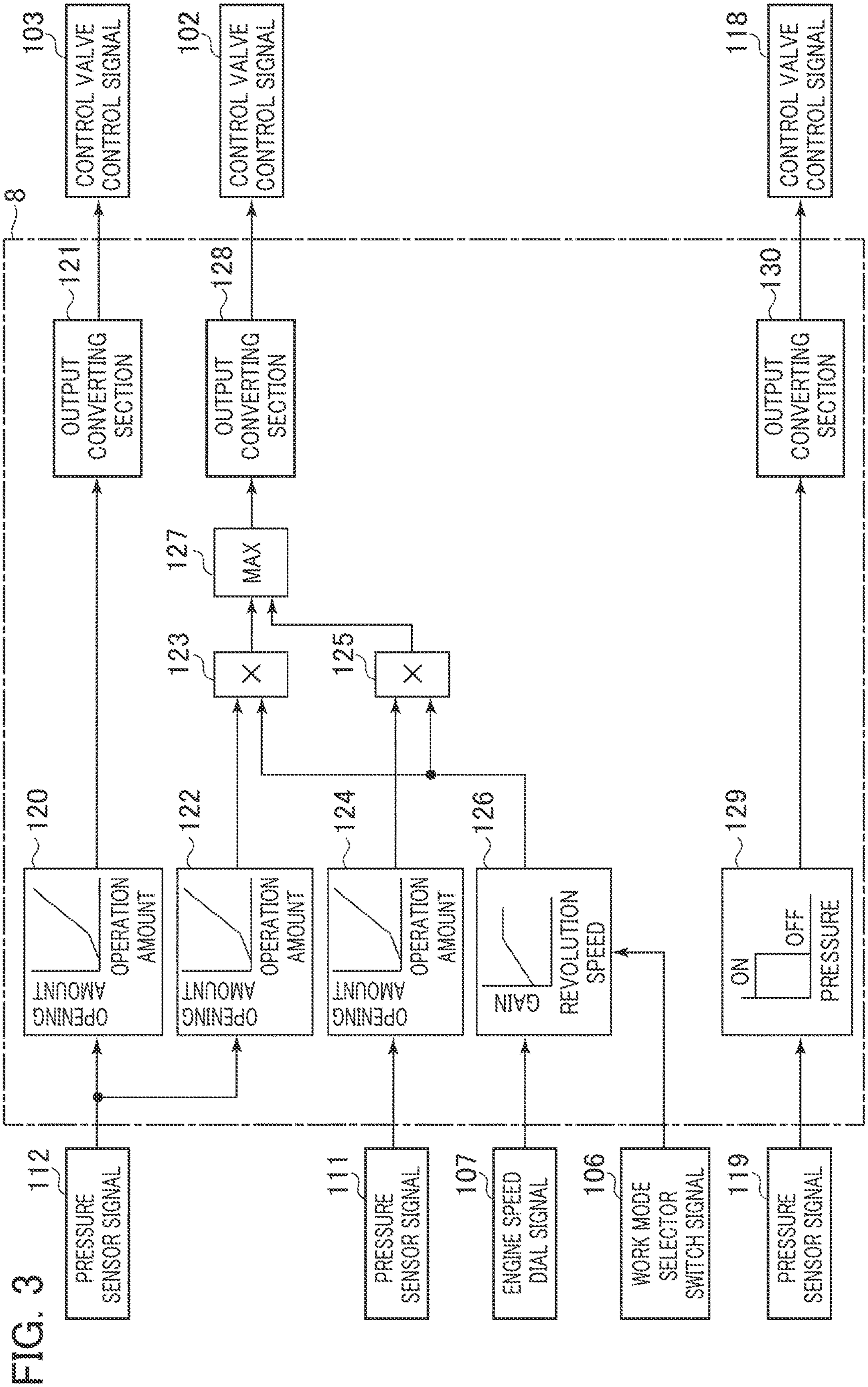
FIG. 3 is a diagram illustrating processing contents of a controller illustrated in FIG. 2.

FIG. 3 is a diagram illustrating processing contents of the controller 8.

In FIG. 3, a pressure sensor signal 112 is a signal inputted to the controller 8 according to the boom raising pilot pressure Pu (boom raising operation amount) detected by the pressure sensor 12. A pressure sensor signal 111 is a signal inputted to the controller 8 according to the boom lowering pilot pressure Pd (boom lowering operation amount) detected by the pressure sensor 11. An engine speed dial signal 107 is a signal inputted to the controller 8 according to the engine speed set by the engine speed dial 7. A work mode selector switch signal 106 is a signal inputted to the controller 8 according to the work mode selected by the work mode selector switch 6. A pressure sensor signal 119 is a signal inputted to the controller 8 according to the pressure of the accumulator 4 detected by the pressure sensor 19.

A function generating section 120 converts the pressure sensor signal 112 (boom raising operation amount) into a target opening amount of the rod side control valve 3, and outputs the target opening amount to an output converting section 121. The output converting section 121 outputs, to the rod side control valve 3, a control signal corresponding to the target opening amount from the function generating section 120. Thus, the rod side control valve 3 is opened according to the boom raising operation amount, and the hydraulic operating fluid on the rod side of the boom cylinder 1 is discharged into the hydraulic operating fluid tank 14.

A function generating section 122 converts the pressure sensor signal 112 (boom raising operation amount) into a target opening amount of the bottom side control valve 2, and outputs the target opening amount to a multiplying section 123. A function generating section 124 converts the pressure sensor signal 111 (boom lowering operation amount) into a target opening amount of the bottom side control valve 2, and outputs the target opening amount to a multiplying section 125. A function generating section 126 outputs a gain corresponding to the engine speed dial signal 107 (engine speed) and the work mode selector switch signal 106 (work mode) to the multiplying sections 123 and 125.

Figure 4:
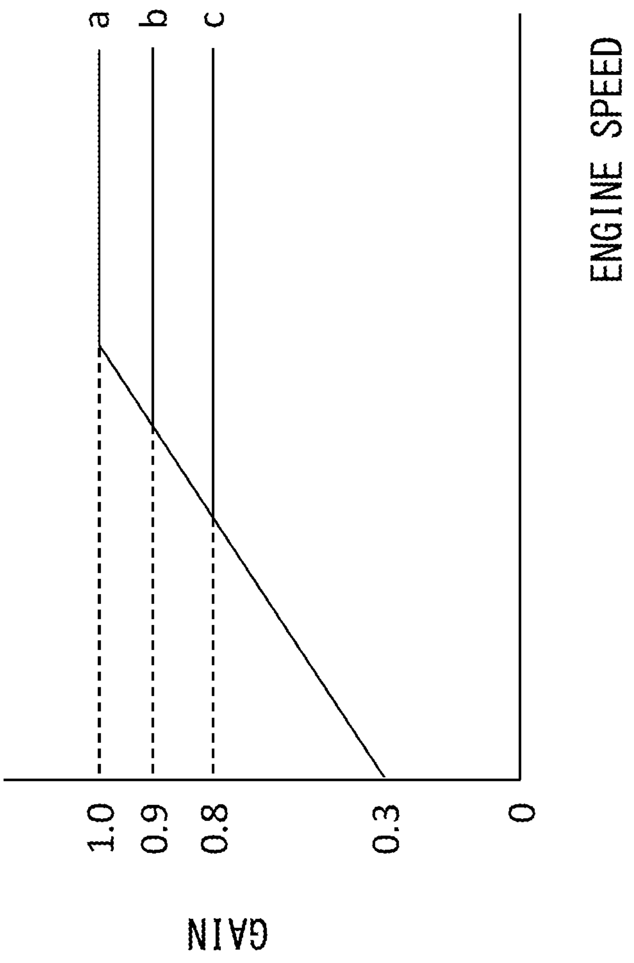
FIG. 4 is a diagram illustrating a correspondence relation between an engine speed and a gain by which a target opening amount of a bottom side control valve is multiplied.

FIG. 4 is a diagram illustrating a correspondence relation between the engine speed and the work mode and the gain. Three characteristics a, b, and c are set in the function generating section 110 in the present embodiment. The function generating section 110 selects one of the characteristics a, b, and c according to the work mode. For example, the characteristic a is selected in a work mode in which importance is attached to work efficiency. The characteristics b and c are selected in work modes in which importance is attached to energy saving. The gain of the characteristic a continuously increases from a lower limit value (for example, 0.3) to an upper limit value (1.0) according to the engine speed. The gain of the characteristic b continuously increases from a minimum value (0.3) to a predetermined upper limit value (for example, 0.9) according to the engine speed. The gain of the characteristic c continuously increases from a lower limit value (0.3) to a predetermined upper limit value (for example, 0.8) according to the engine speed. By thus changing the gain according to the engine speed, it is possible to adjust sensitivity of the opening amount of the bottom side control valve 2 with respect to the operation amount of the boom control lever 5 according to the engine speed. In addition, changing the upper limit value of the gain according to the work mode makes it possible to regulate a maximum operation speed of the actuator according to the work mode.

Described with reference to FIG. 3 again, the multiplying section 123 multiplies the target opening amount from the function generating section 122 by the gain from the function generating section 126, and outputs the target opening amount multiplied by the gain to a maximum value selecting section 127. The multiplying section 125 multiplies the target opening amount from the function generating section 124 by the gain from the function generating section 126, and outputs the target opening amount multiplied by the gain to the maximum value selecting section 127. The maximum value selecting section 127 selects the larger of the target opening amount from the multiplying section 123 and the target opening amount from the multiplying section 125, and outputs the larger target opening amount to an output converting section 128. The output converting section 128 outputs, to the bottom side control valve 2, a control valve control signal 102 corresponding to the target opening amount from the maximum value selecting section 127. Hence, when the boom control lever 5 is operated in the boom raising direction, the bottom side control valve 2 is opened according to the boom raising operation amount, and the hydraulic fluid of the accumulator 4 is supplied to the bottom side of the boom cylinder 1. On the other hand, when the boom control lever 5 is operated in the boom lowering direction, the bottom side control valve 2 is opened according to the boom lowering operation amount, a part of the hydraulic fluid on the bottom side of the boom cylinder 1 that is increased in pressure by the pressure increasing control valve 9 being opened is accumulated in the accumulator 4, and a remaining part is supplied to the rod side of the boom cylinder 1.

A function generating section 129 converts the pressure sensor signal 119 (pressure of the accumulator 4) into an ON/OFF position of the charge control valve 18, and outputs the ON/OFF position to an output converting section 130. Specifically, when the pressure of the accumulator 4 is lower than a predetermined value, an ON position is output. When the pressure of the accumulator 4 is equal to or higher than the predetermined value, an OFF position is output. The output converting section 130 outputs, to the charge control valve 18, a control valve control signal corresponding to the ON/OFF position from the function generating section 129. Hence, when the pressure of the accumulator 4 falls below the predetermined value, pressure is accumulated in the accumulator 4 by the hydraulic pump 13.

In the present embodiment, in a construction machine 200 including an engine 20, a revolution speed setting device 7 for setting a revolution speed of the engine 20, an actuator 1, a pressure accumulating device 4 that accumulates a return oil from the actuator 1, a first control valve 2 disposed on a hydraulic fluid line 30 that connects the pressure accumulating device 4 and the actuator 1 to each other, an operation device 5 for giving an instruction for operation of the actuator 1, and a controller 8 that is inputted with an operation signal of the operation device 5 and outputs a control signal to the first control valve 2, the controller 8 controls the first control valve 2 according to the operation amount of the operation device 5 and the revolution speed set by the revolution speed setting device 7.

According to the present embodiment configured as described above, in the construction machine 200 equipped with the pressure accumulating device 4 that accumulates the return oil of the actuator 1, the flow rate of the hydraulic fluid supplied and discharged to and from the actuator 1 by the pressure accumulating device 4 changes according to the revolution speed of the prime mover 20. It is thereby possible to adjust the operation speed of the actuator 1 according to the revolution speed of the prime mover 20, and maintain a speed balance between the actuator 1 supplied with the hydraulic fluid from the pressure accumulating device 4 and other actuators supplied with the hydraulic fluid from the hydraulic pump 13 when work is performed while the revolution speed of the prime mover 20 is decreased.

In addition, the construction machine 200 according to the present embodiment includes a hydraulic operating fluid tank 14, a hydraulic pump 13 that is driven by the prime mover 20 and sucks a hydraulic operating fluid from the hydraulic operating fluid tank 14 and delivers the hydraulic operating fluid, a pressure sensor 19 that detects a pressure of the pressure accumulating device 4, and a second control valve 18 that connects a delivery port of the hydraulic pump 13 to one of the hydraulic operating fluid tank 14 and the pressure accumulating device 4 according to a control signal from the controller 8. The controller 8 outputs the control signal to the second control valve 18 such that the delivery port of the hydraulic pump 13 is connected to the hydraulic operating fluid tank 14 when the pressure detected by the pressure sensor 19 is equal to or higher than a predetermined pressure and such that the delivery port of the hydraulic pump 13 is connected to the pressure accumulating device 4 when the pressure detected by the pressure sensor 19 is lower than the predetermined pressure. Thus, the pressure of the pressure accumulating device 4 is kept equal to or higher than the predetermined pressure, so that the actuator 1 can be driven in any timing.

In addition, the construction machine 200 according to the present embodiment includes a boom 205, and the actuator 1 is a boom cylinder that drives the boom 205. Thus, the operator can adjust the operation speed of the boom cylinder 1 by changing the revolution speed of the prime mover 20 via the revolution speed setting device 7.

In addition, in the present embodiment, the prime mover 20 is an engine, the revolution speed setting device 7 is an engine speed dial that sets a revolution speed of the engine 20, and the target opening amount is computed by multiplying an opening amount of the first control valve 2, the opening amount corresponding to the operation amount of the operation device 5, by a gain corresponding to the revolution speed set by the engine speed dial 7. It is thereby possible to adjust the operation speed of the actuator 1 via an operation of the engine speed dial 7.

In addition, the construction machine 200 according to the present embodiment includes a work mode selecting device 6 for selecting a work mode, and the controller 8 changes an upper limit value of the gain according to the work mode selected by the work mode selecting device 6. The operator can thereby limit a maximum operation speed of the actuator 1 according to the work mode selected via the work mode selecting device 6.

Incidentally, while the bottom side control valve 2 and the rod side control valve 3 are configured to be controlled by control signals corresponding to target opening amounts in the present embodiment, a flow control valve controlled by a control signal corresponding to a target flow rate can be used as the bottom side control valve 2 and the rod side control valve 3. In that case, the controller 8 is configured to output control signals corresponding to target flow rates to the bottom side control valve 2 and the rod side control valve 3 in place of the control signals corresponding to the target opening amounts.

An embodiment of the present invention has been described above in detail. However, the present invention is not limited to the foregoing embodiment, and includes various modifications. For example, the foregoing embodiment has been described in detail in order to describe the present invention in an easy-to-understand manner, and is not necessarily limited to the embodiment including all of the described configurations.

DESCRIPTION OF REFERENCE CHARACTERS

1: Boom cylinder (actuator)
2: Bottom side control valve (first control valve)
3: Rod side control valve
4: Accumulator (pressure accumulating device)
5: Boom control lever (operation device)
6: Work mode selector switch (work mode selecting device)
7: Engine speed dial (revolution speed setting device)
8: Controller
9: Control valve
10: Pilot check valve
11: Pressure sensor
12: Pressure sensor
13: Hydraulic pump
14: Hydraulic operating fluid tank
18: Charge control valve (second control valve)
19: Pressure sensor
20: Engine (prime mover)
30: Bottom side hydraulic fluid line
31: Rod side hydraulic fluid line
32: Communication hydraulic fluid line
102: Control valve control signal
103: Control valve control signal
106: Work mode selector switch signal
107: Engine speed dial signal
111, 112: Pressure sensor signal
118: Control valve control signal
119: Pressure sensor signal
120, 122, 124, 126, 129: Function generating section
121, 128, 130: Output converting section
123, 125: Multiplying section
127: Maximum value selecting section
200: Hydraulic excavator (construction machine)
201: Track structure
202: Swing structure
203: Work device
204: Swing motor
205: Boom
206: Arm
207: Bucket
208: Arm cylinder
209: Bucket cylinder
210: Cab
211: Counterweight
212: Machine room
213: Control valve

The invention claimed is:

1. A construction machine comprising:
a prime mover;
a revolution speed setting device for setting a revolution speed of the prime mover;
a cylinder;
a pressure accumulating device that accumulates a hydraulic fluid discharged from the cylinder and supplies the hydraulic fluid to the cylinder;
a hydraulic operating fluid tank;
a bottom side hydraulic fluid line that connects the pressure accumulating device and a bottom side oil chamber of the cylinder to each other;
a rod side hydraulic fluid line that connects a rod side oil chamber of the cylinder and the hydraulic operating fluid tank to each other;
a communication hydraulic fluid line that connects the bottom side hydraulic fluid line and the rod side hydraulic fluid line to each other;
a first control valve that is disposed on the bottom side hydraulic fluid line;
an operation device for giving an instruction for extension and contraction of the cylinder; and
a controller that is inputted with an operation signal corresponding to an operation amount of the operation device and outputs a control signal to the first control valve, wherein the construction machine comprises:

a pressure increasing control valve that is disposed on the communication hydraulic fluid line and opens when the cylinder is operated to contract by the operation device;

a hydraulic pump that is driven by the prime mover, sucks the hydraulic fluid from the hydraulic operating fluid tank and delivers the hydraulic fluid;

a pressure sensor that senses a pressure of the pressure accumulating device; and a second control valve that connects a delivery port of the hydraulic pump to one of the hydraulic operating fluid tank and the pressure accumulating device according to a control signal from the controller, the controller is configured to output the control signal to the second control valve such that the delivery port of the hydraulic pump is connected to the hydraulic operating fluid tank in a case where the pressure detected by the pressure sensor is equal to or higher than a predetermined pressure and such that the delivery port of the hydraulic pump is connected to the pressure accumulating device in a case where the pressure detected by the pressure sensor is lower than the predetermined pressure, compute a target opening amount by multiplying an opening amount of the first control valve, the opening amount corresponding to the operation amount of the operation device, by a gain of 1 or less that continuously changes according to the revolution speed of the prime mover set by the revolution speed setting device, and change the opening amount of the first control valve, thereby controlling a flow rate of the hydraulic fluid to be supplied from the pressure accumulating device to the cylinder or a flow rate of the hydraulic fluid to be regenerated from the cylinder to the pressure accumulating device.

2. The construction machine according to claim 1, comprising:

a boom, wherein the cylinder is a boom cylinder that drives the boom.

3. The construction machine according to claim 1, wherein the prime mover is an engine, the revolution speed setting device is an engine speed dial that sets a revolution speed of the engine.

4. The construction machine according to claim 3, comprising:

a work mode selecting device for selecting a work mode, wherein the controller is configured to change an upper limit value of the gain according to the work mode selected by the work mode selecting device.

* * * * *